March 9, 1954     H. W. BROWN     2,671,704
PISTON AND ROD
Filed June 4, 1952
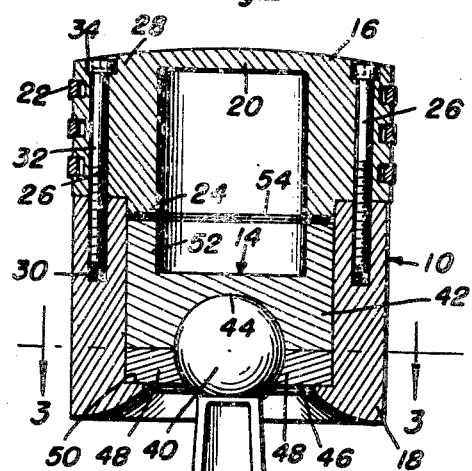
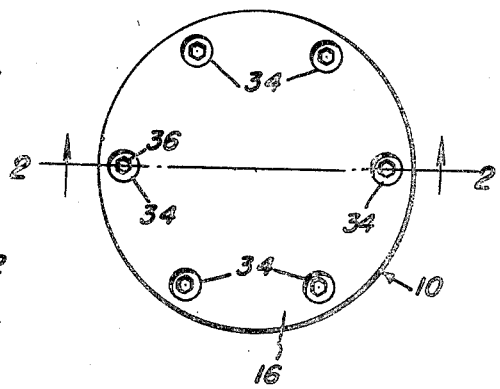
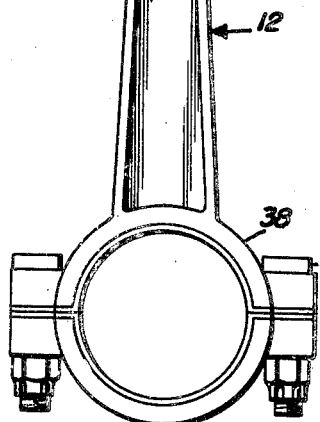
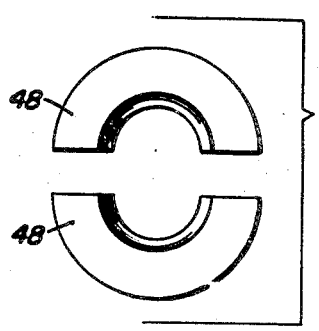
Huie W. Brown
INVENTOR.

Patented Mar. 9, 1954

2,671,704

UNITED STATES PATENT OFFICE 2,671,704

PISTON AND ROD

Huie W. Brown, St. Louis, Mo.

Application June 4, 1952, Serial No. 291,660

3 Claims. (Cl. 309—20)

This invention relates in general to engine components, and more particularly to a piston and connecting rod construction.

The primary object of this invention is to provide an improved piston and connecting rod assembly which is of such a construction whereby piston rings may be easily and quickly installed on a piston so constructed without removing the connecting rod from within an associating cylinder.

Another object of this invention is to provide an improved connection between a piston and the connecting rod, said connection including a bearing carried within a hollow piston and having received therein a spherical upper end of a connecting rod, said connection eliminating the use of conventional piston pins.

Another object of this invention is to provide an improved piston and connecting rod construction which is relatively compact and of a simple form whereby the same is economically feasible.

A further object of this invention is to provide an improved bearing construction for connecting pistons to connecting rods, said bearing construction being carried within a piston and being formed in a plurality of parts whereby the same may be easily disconnected from a spherical upper end of a connecting rod.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a top plan view of the piston and connecting rod assembly, which is the subject of this invention, and shows the relative positions of fasteners securing together various portions of the assembly;

Figure 2 is a transverse vertical sectional view taken substantially upon the plane indicated by the section line 2—2 of Figure 1 and shows the general construction of the piston and connecting rod assembly and includes the manner in which the various elements thereof are secured together;

Figure 3 is a transverse horizontal sectional view taken substantially upon the plane indicated by the section line 3—3 of Figure 2 and shows the general construction of the bearing means carried by the piston for connecting the piston to the connecting rod; and Figure 4 is an exploded top plan view of a collar portion of the bearing for connecting the piston to the connecting rod and shows the general construction thereof whereby the same may be easily removed from engagement with a spherical upper end of the connecting rod.

Similar characters of reference designate similar or identical elements and portions throughout the specification and throughout the different views of the drawings.

Referring now to the drawings in detail, it will be seen that there is illustrated in Figure 2 a piston and connecting rod assembly which includes a piston, which is referred to in general by the reference numeral 10, and a connecting rod, which is referred to in general by the reference numeral 12. The piston is connected to the connecting rod 12 by a special bearing construction, which is referred to in general by the reference numeral 14.

The piston 10 is formed in two halves and includes an upper half 16 and a lower half 18. The upper half of the piston 10 is hollow and has a closed upper end, the upper end being closed by a top portion 20. The side walls of the upper half 16 are provided with a plurality of piston ring grooves in which are mounted conventional piston rings 22. The lower half of the piston 10 is in the form of a conventional skirt and is generally cylindrical in outline. It will be noted that the lower half 18 abuts the upper half 16 and receives a downwardly extending central portion of the upper half 16 in telescoping relation, the downwardly extending portion being referred to by the reference numeral 24.

In order that the upper half 16 may be secured to the lower half 18 of the piston 10, the upper half 16 is provided with a plurality of circumferentially spaced vertical bores 26 which are provided with countersunk portions 28 at the upper ends thereof. The bores 26 are aligned with internally threaded bores 30 in the lower portion 18 and have passed therethrough conventional fasteners 32. It will be understood that the fasteners 32 preferably have heads 34 which are disposed in the countersunk portions 28 of the bores 26 and which are provided with Allen screw receiving recesses 36 in the upper ends thereof. It will be seen that when it is desired to replace the piston rings 22, the upper half 16 may be removed from an associated cylinder (not shown) by merely removing the fasteners 32 and lifting the upper half 16 out of the cylinder.

The connector rod 12 is similar to conventional connecting rods in that it is provided with a split lower portion 38 for receiving and clampingly engaging a connecting rod bearing, said connecting rod bearing being adapted to be mounted on a crank shaft (not shown), the lower portion 38 of the connecting rod 12 also connecting the connecting rod 12 to the crank shaft. The upper end of the connecting rod 12 differs from the conventional connecting rods in that it is provided with a spherical member 40 at the extreme upper end thereof. It will be seen that the spherical portion 40 is received within the bearing 14 and connects the piston 10 to the connecting rod 12 for pivotal movement.

The bearing 14 includes a cap portion 42, which is provided with a recess 44 of semi-spherical shape, the cap portion 42 being adapted to engage the upper portion of the spherical portion 40. The bearing 14 also includes a collar portion, which is referred to in general by the reference numeral 46 and divided into two halves 48. It will be noted that the collar portion 46 has received therein a lower portion of the spherical portion 40 and in combination with the cap portion 42 forms a spherical socket in which the spherical portion 40 is retained.

It will be noted that the lower half 18 of the piston 10 is provided adjacent its lower end with an inwardly extending annular shoulder 50 on which the collar portion 46 seats. The cap portion 42 of the bearing 14 is provided with an annular projection 52 which extends outwardly and is in alignment with the projection 24 of the upper half 16. In order that the relationship of the bearing 14 with respect to the spherical portion 40 of the connecting rod 12 may be adjusted to the desired fit, there is positioned between the projections 24 and 52 a plurality of annular shims 54. It will be seen that inasmuch as the upper half 16 of the piston 10 clamps the bearing 14 against the annular shoulder 50 of the lower half 18, that the clamping action on the bearing 14 is dependent upon the thickness of the shims 54, which may be added or removed as desired.

With the present piston and connecting rod assembly, when it is desired to replace the piston rings 22, the piston 10 is moved to a top dead-center position and the fasteners 32 are removed and the upper half 16 of the piston is pulled out of the cylinder. However, it will be understood that in order that the lower half 18 of the piston 10 and its associated bearing 14 may not drop down into the cylinder with which they are associated, one of the fasteners 32 will be replaced by an elongated stud (not shown) which is of a length to permit the removal of the upper part 16 out of the associated cylinder and at the same time does not permit downward movement of the lower half 18.

While it has not been specifically illustrated, it will be understood that the connecting rod 12 may be provided with a longitudinally extending bore which extends through the spherical portion 40 in order that the bearing 14 may be pressure lubricated. However, if it is so desired and thought to be practical, other types of lubrication for the bearing 14 may be utilized.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. In combination a piston and its associated connecting rod, said piston being hollow and having clamped in the lower portion thereof bearing means connecting said piston to said connecting rod, said piston including an upper half and a lower half removably secured together, the upper half of said piston being provided with piston rings whereby the renewing of the same is facilitated, said bearing means including upper and lower portions, the lower portion of said bearing means being restrained by the lower half of said piston, the upper half of said piston engaging the upper portion of the bearing means, removable shims positioned between the upper half of said piston and the upper portion of the bearing means for adjusting the clamping force on said bearing means.

2. The combination of a piston and a connecting rod, said piston including an upper half and a lower half, said piston halves being releasably secured together, said lower piston half being tubular and having an inwardly projecting annular flange adjacent its lower end, a split lower bearing half seated on said flange, said lower bearing half forming a semi-spherical socket, said connecting rod having a spherical upper end, said connecting rod passing through said lower bearing half and seated in said socket, an upper bearing half disposed within said lower piston half, said upper bearing half having a second semi-spherical socket receiving the uppermost portion of said spherical upper end, said bearing halves being clamped within said lower piston half by said upper piston half, shims replaceably disposed between said upper piston half and said upper bearing half for varying the clamping force on said bearing halves.

3. The combination of claim 2 wherein said upper piston half has a depending portion received within the upper portion of said lower piston half, peripheral portions of said piston halves being in abutting relation and said depending portion engaging said shims.

HUIE W. BROWN.

References Cited in the file of this patent

UNITED STATES PATENTS

| Number | Name | Date |
|---|---|---|
| 97,231 | Root | Nov. 23, 1869 |
| 1,739,705 | Barnes et al. | Dec. 17, 1929 |
| 1,784,837 | Hiatt | Dec. 16, 1930 |
| 2,095,381 | Donaldson | Oct. 12, 1937 |
| 2,438,839 | Beeh | Mar. 30, 1948 |

FOREIGN PATENTS

| Number | Country | Date |
|---|---|---|
| 293,506 | Great Britain | July 12, 1928 |